(Model.)
S. S. NEBLETT.
TOBACCO PLANTER.
No. 271,507. Patented Jan. 30, 1883.
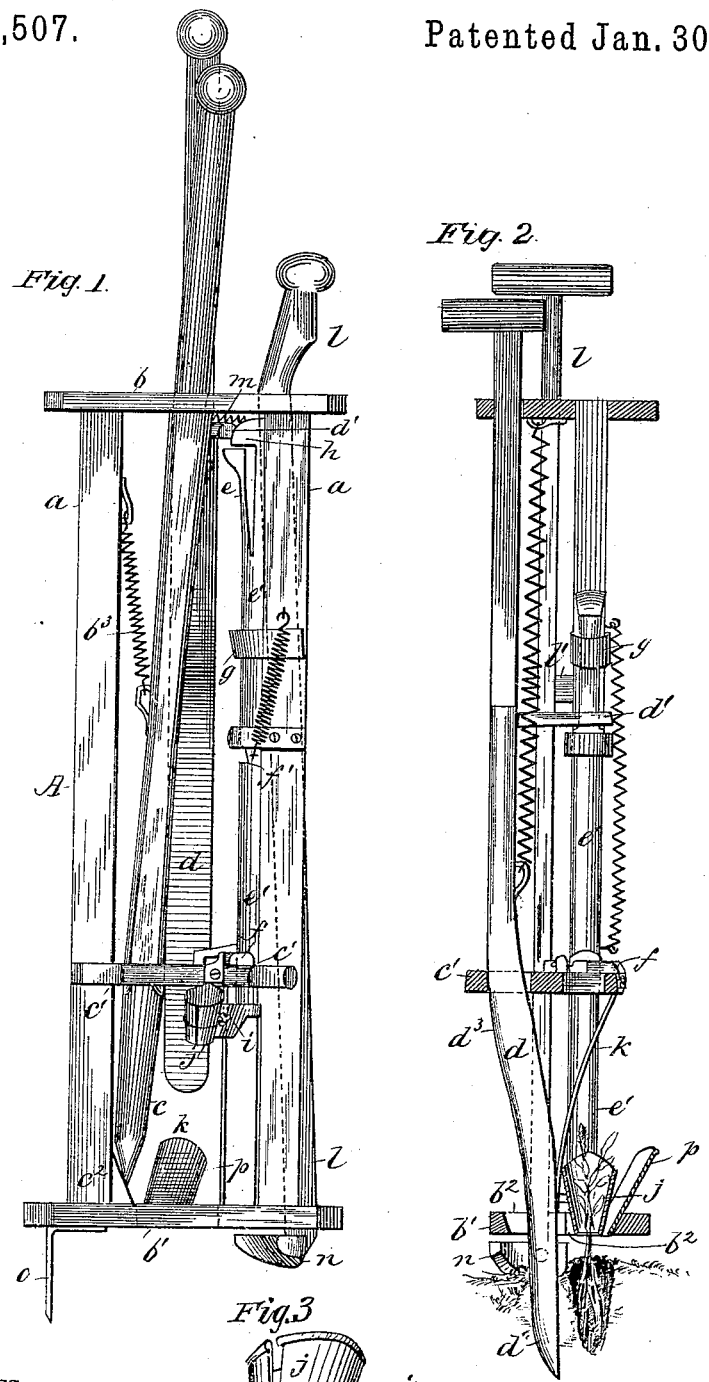
WITNESSES:
Fred. G. Dieterich
A. G. Sepue
INVENTOR:
S. S. Neblett
BY
ATTORNEYS.

UNITED STATES PATENT OFFICE.

SIDNEY S. NEBLETT, OF WHITTLE'S MILLS, VIRGINIA.

TOBACCO-PLANTER.

SPECIFICATION forming part of Letters Patent No. 271,507, dated January 30, 1883.

Application filed July 5, 1882. (Model.)

*To all whom it may concern:*

Be it known that I, SIDNEY SMITH NEBLETT, of Whittle's Mills, in the county of Lunenburg and State of Virginia, have invented a new and useful Improvement in Tobacco-Planters, of which the following is a full, clear, and exact description, reference being had to the annexed drawings, forming part of this specification.

This invention relates to implements for setting out tobacco and other plants without requiring the operator to stoop.

The invention consists of the combination of parts hereinafter described, and pointed out in the claims.

In the drawings, Figure 1 is a side elevation. Fig. 2 is a vertical section, showing the manner of depositing the plant in the hole and securing it therein; and Fig. 3 is a perspective view.

A represents a frame, consisting of two uprights, $a\ a$, connected at the upper and lower ends by cross-pieces $b\ b'$, respectively.

The cross-piece $b'$ is provided with a central opening, $b^2$, through which a spring-actuated perforator, $c$, supported in the upper cross-piece and provided with a guide, $c'$, is adapted to be forced to make a hole in the ground for the plant. The lower end of the perforator, which is pointed, is adapted to be held normally to one side of the opening $b^2$ by the spring $b^3$, in which position its point rests against a grooved and inclined block, $c^2$, which serves as a guide for the perforator to the opening $b^2$, when it is to be forced downward. As soon as the hole for the plant is made the spring $b^3$ is allowed to lift the perforator out of the opening $b^2$, and a second spring-actuated bar, $d$, supported in like manner in the cross-piece $b$ and the guide $c'$, and having an arm, $d'$, is pressed downward through the opening $b^2$. As it begins to descend the arm $d'$ engages with the upper end of a spring, $e$, secured to a bar, $e'$, and forces the bar $e'$ down with it until a spring-actuated catch, $f$, which is pivoted to the guide $c'$, engages automatically with a notch, $f'$, in the bar $e'$. At the same instant a cuff, $g$, inclosing the bar $e'$, causes the spring $e$ to be inclined toward the bar $e'$ under a projection, $h$, on the bar, whereby the arm $d'$ is allowed to pass on.

To the lower end of the bar $e'$ is pivoted an arm, $i$, carrying a funnel-shaped device, $j$, in which the plant is to be deposited preparatory to being set. The holder $j$ is slit longitudinally and inclosed by a spring, $j'$, the ends of which are secured to opposite sides of the arm $i$, whereby the holder, which is to be of light spring metal, may be contracted or allowed to expand by the adjustment of the spring $j'$ by the screw $i^2$ when it is desired to set out smaller or larger plants.

The arm $i$ is provided with an eye, which incloses a wire guide, $k$, and the said guide is bent in such manner that as the bar $e'$ and its arm $i$ descend the arm will be oscillated by the guide to bring the plant-holder directly within the opening $b^2$, by which movement the roots of the plant, which project through the holder, will be inserted sufficiently deep into the hole prepared in the ground.

The catch $f$ is so arranged that it will arrest the downward movement of the bar $e'$ as soon as the plant-holder reaches its lowest position. At the same time the bar $d$, which has forced the bar $e'$ down to the position described, is pressed still farther down until its point is forced into the ground beside the plant to press the loose soil thereto. This bar $d$ is provided with a plane surface next to the plant, and is beveled on the opposite side to a blunt edge, so that as it descends into the ground the point will be inclined toward the plant to press the soil close to the roots. As a means of still better accomplishing this object, the bar $d$ is provided with a curve, $d^3$, which comes in contact with the guide $c'$ as it descends, thus forcing the bar inward toward the plant as it reaches its lowest position. As soon as the soil has thus been pressed to the roots of the plant the spring of bar $d$ is allowed to withdraw the latter to its normal position, when a lever, $l$, pivoted at $l'$ and having a retaining-spring, $m$, is oscillated against the catch $f$, whereby the latter is thrown out of engagement with the bar $e'$, to allow the retaining-spring of the latter to retract it to its normal position.

The lower end of the lever $l$, which projects through a slot in the cross-piece $b'$, is provided with a foot, $n$, which is adapted to scrape earth into the hole left by the bar $d$. The movement by which the plant-holder is released thus serves also to close the hole last made in the ground, and thus the operation of setting a plant is completed.

In order to steady the implement upon the hill where the plant is to be set, I provide the lower cross-piece, $b'$, with a pair of slender iron legs, $o$, at one end, which readily sink into the ground under the weight of the device. I also provide a curved plate, $p$, which is adapted to guide the plant-holder to the opening $b^2$.

The lever and bars are to be provided with suitable handles, as shown, the handle of the lever also serving as a means of carrying the implement.

I design to use metal in the construction of any part of the planter wherever such a use would be desirable to give strength and resist the wearing of the parts.

Having thus described my invention, what I claim, and desire to secure by Letters Patent, is—

1. The combination of the frame, the spring-actuated perforator, the inclined block for guiding the perforator, the funnel-shaped holder and means for operating the same, and the bar for pressing the soil to the roots of the plant, substantially as shown and described.

2. The combination of the frame, the spring-actuated perforator, the sliding bar carrying the swinging funnel-shaped holder, the bent-wire guide for the holder, and the bar for pressing the soil to the plant, having means for operating the bar carrying the holder and means for holding the bar of the holder in position for setting the plant, substantially as shown and described.

3. The combination of the frame, the perforator, the bar carrying the holder, having a spring adapted to be operated by a cuff inclosing the bar, and the bar for pressing the soil to the plant, having an arm adapted to engage with said spring to operate the bar against the tension of a spring, and means for holding the latter bar in a given position, substantially as shown and described.

4. The combination of the frame, the perforator, the bar carrying the oscillating holder, the latch adapted to engage with said bar, the lever adapted to trip said catch, and the bar for pressing the soil to the plant, having means for operating said bar against the tension of a spring, substantially as shown and described.

5. The combination of the frame, the perforator, the holder and its operating devices, and the bar for pressing the soil to the roots of the plant, having its surface next to the plant made plane on a line parallel with the plant and beveled on the opposite side, and having a curve adapted to move against a guide to throw the point of the said bar inward toward the roots of the plant, as and for the purpose described.

6. The combination, with the perforator, the plant-holder, and the bar for pressing soil to the plant, of the frame having the lower cross-piece provided with a central opening, and having two legs at one end, and a curved plate on its upper side adapted to serve as a guide for the plant-holder, substantially as shown and described.

SIDNEY SMITH NEBLETT.

Witnesses:
A. G. LYNE,
JOHN T. LAWRENCE.